United States Patent [19]

McMurdie et al.

[11] Patent Number: 5,972,189

[45] Date of Patent: Oct. 26, 1999

[54] ELECTRODEPOSITABLE COATING COMPOSITION CONTAINING BISMUTH DIORGANODITHIOCARBAMATES AND METHOD OF ELECTRODEPOSITION

[75] Inventors: Neil D. McMurdie, Pittsburgh; Robert R. Zwack, Allison Park; Matthew S. Scott; Michael L. White, both of Pittsburgh, all of Pa.

[73] Assignee: PPG Industries Ohio, Inc., Cleveland, Ohio

[21] Appl. No.: 09/087,211

[22] Filed: May 29, 1998

[51] Int. Cl.⁶ ..................................................... C25D 13/04
[52] U.S. Cl. ........................... 204/501; 204/506; 523/415
[58] Field of Search ................................. 204/501, 506; 523/415

[56] References Cited

U.S. PATENT DOCUMENTS

| | | | |
|---|---|---|---|
| 5,330,839 | 7/1994 | Yasuoka et al. | 428/413 |
| 5,507,928 | 4/1996 | Bohmert et al. | 204/488 |
| 5,554,700 | 9/1996 | Schipfer et al. | 525/360 |
| 5,631,214 | 5/1997 | Karol et al. | 508/365 |
| 5,656,677 | 8/1997 | Jourquin et al. | 521/126 |
| 5,670,441 | 9/1997 | Foedde et al. | 502/200 |
| 5,702,581 | 12/1997 | Kerlin et al. | 204/486 |
| 5,908,912 | 6/1999 | Kollah et al. | 204/501 |

FOREIGN PATENT DOCUMENTS

| | | |
|---|---|---|
| 05032919 | 2/1993 | Japan . |
| 05247385 | 9/1993 | Japan . |
| 05311099 | 11/1993 | Japan . |
| 06100805 | 4/1994 | Japan . |
| 06200194 | 7/1994 | Japan . |
| 06248203 | 9/1994 | Japan . |
| WO 95/07377 | 3/1995 | WIPO . |
| WO 95/33083 | 12/1995 | WIPO . |
| WO 96/10057 | 4/1996 | WIPO . |
| WO 97/38056 | 10/1997 | WIPO . |

*Primary Examiner*—Kishor Mayekar
*Attorney, Agent, or Firm*—William J. Uhl; Krissanne Shideler

[57] ABSTRACT

An electrodepositable composition is provided comprising (a) an active hydrogen-containing, cationic salt group-containing resin electrodepositable on a cathode; (b) a capped polyisocyanate curing agent; and (c) bismuth diorganodithiocarbamate. Such compositions may be prepared without the use of conventional lead or tin catalysts and exhibit excellent properties as cured coatings.

Also provided is a method of electrocoating an electroconductive substrate using the composition of the present invention.

25 Claims, No Drawings

ELECTRODEPOSITABLE COATING COMPOSITION CONTAINING BISMUTH DIORGANODITHIOCARBAMATES AND METHOD OF ELECTRODEPOSITION

FIELD OF THE INVENTION

The present invention relates to cationic electrodepositable compositions containing novel catalysts, and to their use in electrodeposition.

BACKGROUND OF THE INVENTION

The application of a coating by electrodeposition involves depositing a film-forming composition to an electrically conductive substrate under the influence of an applied electrical potential. Electrodeposition has gained prominence in the coatings industry because in comparison with non-electrophoretic coating methods, electrodeposition provides higher paint utilization, outstanding corrosion resistance, and low environmental contamination. Early attempts at commercial electrodeposition processes used anionic electrodeposition, where the workpiece being coated served as the anode. However, in 1972, cationic electrodeposition was introduced commercially. Since that time, cationic electrodeposition has become increasingly popular and today is the most prevalent method of electrodeposition. Throughout the world, more than 80 percent of all motor vehicles manufactured are given a primer coating by cationic electrodeposition.

Many cationic electrodeposition compositions used today are based on active hydrogen-containing resins derived from a polyepoxide and a capped polyisocyanate curing agent. These cationic electrodeposition compositions conventionally contain organotin catalysts such as dibutyl tin oxide and lead catalysts to activate cure of the electrodeposition composition. Because of cost and environmental considerations, the levels of these catalysts are kept low. However, low catalyst levels may lessen the cure response of a coating composition, providing weaker properties in the cured film than desired. Appearance of the cured film may also be adversely affected.

Karol et al. in U.S. Pat. No. 5,631,214 disclose the preparation of bismuth dialkyldithiocarbamates for use in lubricant compositions. The reference does not disclose the use of such compounds in cationic electrodepositable compositions.

In copending U.S. Pat. application Ser. No. 08/868,411 now U.S. Pat. No. 5,908,912, Kollah et al. disclose the use of cationic electrodepositable coating compositions which contain catalysts that are complexes of bismuth and amino acids. However, there is no disclosure of the use of bismuth diorganodithiocarbamates in cationic electrodepositable compositions.

Schipfer et al. in South Africa Patent Application No. 93/2977 discloses the use of cationic electrodepositable coating compositions which contain catalysts that are salts of bismuth and carboxylic acids, in particular hydroxycarboxylic acids. Likewise, U.S. Pat. No. 5,554,700 discloses bismuth compounds such as bismuth hydroxy acids as catalysts in aqueous electrodepositable compositions. However, such compounds are prone to hydrolysis, drastically lowering the pH of the electrodepositable composition, making it more corrosive to iron pipes and pumps and yielding bismuth oxide which is insoluble and relatively ineffective as a catalyst. Moreover, the references do not disclose the use of bismuth diorganodithiocarbamates in cationic electrodepositable compositions.

It would be desirable to provide an electrodepositable composition which demonstrates acceptable cure response without loss of cured film properties or appearance, and preferably do not contain tin or lead catalysts.

SUMMARY OF THE INVENTION

In accordance with the present invention, an electrodepositable composition is provided comprising (a) an active hydrogen-containing, cationic salt group-containing resin electrodepositable on a cathode; (b) a capped polyisocyanate curing agent; and (c) a bismuth diorganodithiocarbamate.

Also provided is a method of electrocoating an electroconductive substrate which serves as a cathode in an electrical circuit comprising the cathode and an anode, immersed in the electrodepositable composition described above. The method comprises passing an electric current between the anode and the cathode to cause the electrodepositable composition to deposit on the cathode as a substantially continuous film, and heating the electrodeposited film at an elevated temperature to cure the film.

DETAILED DESCRIPTION

The cationic resin of component (a) may be any suitable cationic resin known to those skilled in the art. It is preferably derived from a polyepoxide, which may be chain extended by reacting together a polyepoxide and a polyhydroxyl group-containing material selected from alcoholic hydroxyl group-containing materials and phenolic hydroxyl group-containing materials to chain extend or build the molecular weight of the polyepoxide. Such chain extension reactions may be conducted under typical conditions as known to those skilled in the art. The resin contains cationic salt groups and active hydrogen groups including aliphatic hydroxyl and primary and secondary amino.

A chain extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants; i. e., epoxy:polyhydroxyl group-containing material is typically from about 1.00:0.75 to 1.00:2.00.

The polyepoxide preferably has at least two 1,2-epoxy groups. In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and preferably about two; that is, polyepoxides which have on average two epoxide groups per molecule. The preferred polyepoxides are polyglycidyl ethers of cyclic polyols. Particularly preferred are polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali, using reaction conditions typical for etherification as known to those skilled in the art. Besides polyhydric phenols, other cyclic polyols can be used in preparing the polyglycidyl ethers of cyclic polyols. Examples of other cyclic polyols include alicyclic polyols, particularly cycloaliphatic polyols such as 1,2-cyclohexane diol and 1,2-bis(hydroxymethyl)cyclohexane. The preferred polyepoxides have molecular weights ranging from about 180 to 500, preferably from about 186 to 350. Epoxy group-containing acrylic polymers can also be used, but they are not preferred.

Examples of polyhydroxyl group-containing materials used to chain extend or increase the molecular weight of the polyepoxide (i. e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used. Bisphenol A is preferred.

The active hydrogen-containing cationic resin also contains cationic salt groups. The cationic salt groups are preferably incorporated into the resin by reacting the epoxy group-containing resinous reaction product prepared as described above with a cationic salt group former. By "cationic salt group former" is meant a material which is reactive with epoxy groups and which can be acidified before, during, or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

When amines are used as the cationic salt formers, monoamines are preferred, and hydroxyl-containing amines are particularly preferred. Polyamines may be used but are not recommended because of a tendency to gel the resin.

Tertiary and secondary amines are preferred to primary amines because primary amines are polyfunctional with respect to epoxy groups and have a greater tendency to gel the reaction mixture. If polyamines or primary amines are used, they should be used in a substantial stoichiometric excess to the epoxy functionality in the polyepoxide so as to prevent gellation and the excess amine should be removed from the reaction mixture by vacuum stripping or other technique at the end of the reaction. The epoxy may be added to the amine to ensure excess amine.

Examples of hydroxyl-containing amines are alkanolamines, dialkanolamines, trialkanolamines, alkyl alkanolamines, and aralkyl alkanolamines containing from 1 to 18 carbon atoms, preferably 1 to 6 carbon atoms in each of the alkanol, alkyl and aryl groups. Specific examples include ethanolamine, N-methylethanolamine, diethanolamine, N-phenylethanolamine, N,N-dimethylethanolamine, N-methyldiethanolamine, triethanolamine and N-(2-hydroxyethyl)-piperazine.

Amines such as mono, di, and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine and N,N-dimethylcyclohexylamine.

Mixtures of the above mentioned amines may also be used.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature of about 50 to 150° C. may be done to hasten the reaction.

The reaction product of the primary and/or secondary amine and the polyepoxide is made cationic and water dispersible by at least partial neutralization with an acid. Suitable acids include organic and inorganic acids such as formic acid, acetic acid, lactic acid, phosphoric acid and sulfamic acid. Sulfamic acid is preferred. The extent of neutralization varies with the particular reaction product involved. However, sufficient acid should be used to disperse the electrodepositable composition in water. Typically, the amount of acid used provides at least 20 percent of all of the total neutralization. Excess acid may also be used beyond the amount required for 100 percent total neutralization.

In the reaction of a tertiary amine with a polyepoxide, the tertiary amine can be prereacted with the neutralizing acid to form the amine salt and then the amine salt reacted with the polyepoxide to form a quaternary salt group-containing resin. The reaction is conducted by mixing the amine salt with the polyepoxide in water. Typically the water is present in an amount ranging from about 1.75 to about 20 percent by weight based on total reaction mixture solids.

In forming the quaternary ammonium salt group-containing resin, the reaction temperature can be varied from the lowest temperature at which the reaction will proceed, generally room temperature or slightly thereabove, to a maximum temperature of about 100° C. (at atmospheric pressure). At higher pressures, higher reaction temperatures may be used. Preferably the reaction temperature is in the range of about 60 to 100° C. Solvents such as a sterically hindered ester, ether, or sterically hindered ketone may be used, but their use is not necessary.

In addition to the primary, secondary, and tertiary amines disclosed above, a portion of the amine that is reacted with the polyepoxide can be a ketimine of a polyamine, such as is described in U.S. Pat. No. 4,104,147, column 6, line 23 to column 7, line 23. The ketimine groups decompose upon dispersing the amine-epoxy resin reaction product in water.

In addition to resins containing amine salts and quaternary ammonium salt groups, cationic resins containing ternary sulfonium groups may be used in forming the active hydrogen-containing cationic resin in the composition of the present invention. Examples of these resins and their method of preparation are described in U.S. Pat. Nos. 3,793,278 to DeBona and 3,959,106 to Bosso et al.

The extent of cationic salt group formation should be such that when the resin is mixed with an aqueous medium and the other ingredients, a stable dispersion of the electrodepositable composition will form. By "stable dispersion" is meant one that does not settle or is easily redispersible if some settling occurs. Moreover, the dispersion should be of sufficient cationic character that the dispersed particles will migrate toward and electrodeposit on a cathode when an electrical potential is set up between an anode and a cathode immersed in the aqueous dispersion.

Generally, the active hydrogen-containing cationic resin of the electrodepositable composition of the present invention is non-gelled and contains from about 0.1 to 3.0, preferably from about 0.1 to 0.7 milliequivalents of cationic salt group per gram of resin solids. The number average molecular weight of the active hydrogen-containing cationic resin preferably ranges from about 2,000 to about 15,000, more preferably from about 5,000 to about 10,000. By "non-gelled" is meant that the resin is substantially free from crosslinking, and prior to cationic salt group formation, the resin has a measurable intrinsic viscosity when dissolved in a suitable solvent. In contrast, a gelled resin, having an essentially infinite molecular weight, would have an intrinsic viscosity too high to measure.

The active hydrogens within the active hydrogen-containing cationic resin include any active hydrogens which are reactive with isocyanates within the temperature range of about 93 to 204° C., preferably about 121 to 177° C., as are known to those skilled in the art. Most often, the active hydrogens are selected from the group consisting of hydroxyl and primary and secondary amino, including mixed groups such as hydroxyl and primary amino. Preferably, the active hydrogen-containing cationic resin will have an active hydrogen content of about 1.7 to 10 milliequivalents, more preferably about 2.0 to 5 milliequivalents of active hydrogen per gram of resin solids.

Typically, the active hydrogen-containing cationic resin of component (a) is present in the electrodepositable composition in amounts of about 40 to about 90, preferably about 50 to about 70 percent by weight based on the total weight of main vehicle resin solids. By "main vehicle resin solids" is meant resin solids attributable to the active hydrogen-containing, cationic salt group-containing resin of component (a) and the polyisocyanate curing agent of component (b).

The electrodepositable composition of the present invention also contains a capped polyisocyanate curing agent. The polyisocyanate curing agent of component (b) may be a fully capped polyisocyanate with substantially no free isocyanate groups, or it may be partially capped and reacted with the resin backbone as described in U.S. Pat. No. 3,984,299. The polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4',4"-triisocyanate, 1,2,4-benzene triisocyanate and polymethylene polyphenyl isocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used. A mixture of diphenylmethane-4,4'-diisocyanate and polymethylene polyphenyl isocyanate is preferred.

Any suitable aliphatic, cycloaliphatic, or aromatic alkyl monoalcohol or phenolic compound may be used as a capping agent for the capped polyisocyanate curing agent in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers.

Other suitable capping agents include oximes such as methyl ethyl ketoxime, acetone oxime and cyclohexanone oxime, lactams such as epsilon-caprolactam, and amines such as dibutyl amine.

Additional suitable capping agents for the polyisocyanate in the composition of the present invention include materials having the structure:

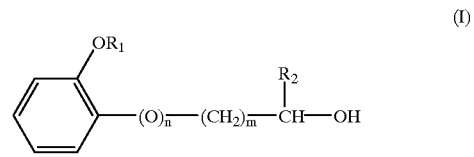

wherein n is 0 or 1; m is 0, 1, or 2; $R_1$ is H or an alkyl group having from 1 to about 10 carbon atoms or an aryl group having from 6 to about 10 carbon atoms, and $R_2$ is H or an alkyl group having from 1 to about 30 carbon atoms or an aryl group having from about 6 to about 30 carbon atoms. The integers n and m are preferably 1. $R_1$ and $R_2$ may be linear or branched aliphatic such as alkyl, including ethyl, 1- or 2-methyl ethyl, propyl, isomers of dimethyl propyl, butyl, pentyl, and the like; cycloaliphatic; aromatic; aralkyl; or alkaryl; and may be substituted. Examples of substituents include hydroxyl, amino, and the like. $R_1$ and, more particularly, $R_2$ may include functional linkages such as urethane, ester, ether, amide, and the like. $R_1$ is preferably a hydrogen or a methyl group and $R_2$ is preferably hydrogen.

The capping agent of structure (I) may be prepared by reacting catechol with an epoxide group-containing compound. Such a reaction may take place under conditions typically employed when reacting phenolic compounds with epoxides.

Examples of suitable epoxide group-containing compounds include ethylene oxide, which is preferred, propylene oxide, 1,2-pentene oxide, and styrene oxide. Larger monoepoxides such as glycidyl esters and ethers containing from about 8 to about 30 carbon atoms may also be used. Examples of glycidyl ethers are glycidyl ethers of alcohols and phenols such as butyl glycidyl ether, octyl glycidyl ether, phenyl glycidyl ether and para-(tertiary-butyl) phenyl glycidyl ether.

Examples of glycidyl esters are those of the structure:

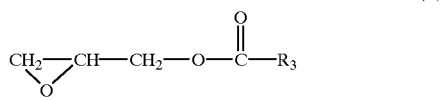
(II)

wherein $R_3$ is a hydrocarbon radical containing from about 4 to about 26 carbon atoms. Glycidyl esters of commercially available mixtures of tertiary aliphatic carboxylic acids such as those available from Shell Chemical Company as VERSATIC ACID 911 are suitable. The glycidyl esters themselves are also commercially available from Shell Chemical Company as CARDURA E.

Examples of preferred capping agents include 2-(2-hydroxyethoxy)phenol and 2-(2-hydroxypropoxy)phenol.

The capped polyisocyanate curing agent may be prepared by reacting the polyisocyanate with the capping agent using conditions and catalysts typically employed when reacting polyisocyanates with active hydrogen-containing materials.

The capped polyisocyanate curing agent of component (b) is typically present in the electrodepositable composition in amounts of about 10 to about 60, preferably about 30 to about 50 percent by weight based on the total weight of main vehicle resin solids. Typically there is sufficient polyisocyanate present in the composition of the present invention to provide about 0.1 to about 1.2 capped isocyanate groups for each active hydrogen in the cationic resin of component (a).

Catalysts comprising bismuth diorganodithiocarbamates are also present in the electrodepositable composition of the present invention. Such compounds may be represented by the structure:

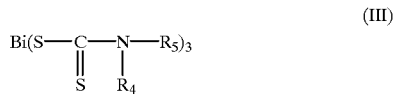
(III)

wherein $R_4$ and $R_5$ are typically selected independently from alkyl, alkenyl, cycloalkyl, aryl, alkaryl, and arylalkyl groups. Such groups may be linear or branched. Alternatively, $R_4$ may be bonded to $R_5$ and form a 5-, 6-, or 7-member ring, for example the dithiocarbamate of N-methylpiperazine. The groups may contain up to 22 carbon atoms and higher and may include hetero atoms such as nitrogen or oxygen, including functional groups such as urethane, ester, ether, amide, and the like. Preferred are lower alkyl derivatives containing 1 to 12 carbon atoms.

Exemplary straight chain and branched aliphatic groups, among others, are methyl, ethyl, butyl, propyl, isopropyl, t-butyl, pentyl, hexyl, 2-ethylhexyl, octyl, decyl, decenyl, octadecenyl, cyclopentyl, cyclohexyl, cyclopentenyl, methylcyclohexyl, methylcyclohexenyl, cyclohexenyl, lauryl, stearyl, and capryl. Exemplary aryl groups, among others, are phenyl, naphthyl, phenylbutyl, hindered dialkylphenyl, propylphenyl, and benzyl. Exemplary hetero groups are oxygen as in methoxy. $R_4$ and $R_5$ are preferably methyl groups.

Component (c) may be prepared using the process disclosed in U.S. Pat. No. 5,631,214.

Component (c) may be incorporated into the electrodepositable composition in a number of ways. If it is an insoluble solid such as dimethyldithiocarbamate, it may be incorporated as a component of a pigment paste by dispersing it in a conventional pigment grinding vehicle such as those disclosed in U.S. Pat. No. 4,007,154, by a grinding or milling process. Alternatively, if it is soluble in the resinous phase such as diisopropyldithiocarbamate, it may be dissolved in the resinous phase. Also, compounds such as the dithiocarbamate of N-methylpiperazine may be converted to their acid salts and be dispersed in the electrodepositable composition.

Component (c) is typically present in the electrodepositable composition of the present invention in amounts of about 0.2 to about 1.5 percent by weight bismuth, preferably about 0.3 to about 1.2 percent by weight bismuth based on the total weight of solids in the electrodepositable composition.

The composition of the present invention is preferably used in an electrodeposition process in the form of an aqueous dispersion. By "dispersion" is meant a two-phase transparent, translucent, or opaque aqueous resinous system in which the resin, curing agent, pigment, and water insoluble materials are the dispersed phase and water and water soluble materials comprise the continuous phase. The dispersion is a stable dispersion as defined earlier. The dispersed phase has an average particle size less than about 10 microns, preferably less than 5 microns. The aqueous dispersion preferably contains at least about 0.05 and usually about 0.05 to 50 percent by weight resin solids, depending on the particular end use of the dispersion.

The aqueous dispersion may optionally contain a coalescing solvent such as hydrocarbons, alcohols, esters, ethers and ketones. Examples of preferred coalescing solvents are alcohols, including polyols, such as isopropanol, butanol, 2-ethylhexanol, ethylene glycol and propylene glycol; ethers such as the monobutyl and monohexyl ethers of ethylene glycol; and ketones such as 4-methyl-2-pentanone (MIBK) and isophorone. The coalescing solvent is usually present in an amount up to about 40 percent by weight, preferably ranging from about 0.05 to 25 percent by weight based on total weight of the aqueous medium.

The electrodepositable composition of the present invention may further contain pigments and various other optional additives such as catalysts, plasticizers, surfactants, wetting agents, defoamers, and anti-cratering agents.

Examples of suitable surfactants and wetting agents include alkyl imidazolines such as those available from Geigy Industrial Chemicals as GEIGY AMINE C, and acetylenic alcohols available from Air Products and Chemicals as SURFYNOL. Examples of defoamers include a hydrocarbon containing inert diatomaceous earth available from Crucible Materials Corp. as FOAMKILL 63. Examples of anti-cratering agents are polyoxyalkylene-polyamine reaction products such as those described in U.S. Pat. No. 4,432,850. These optional ingredients, when present, are usually used in an amount up to 30 percent by weight, typically about 1 to 20 percent by weight based on weight of resin solids.

Suitable pigments include, for example, clay, silica, iron oxides, carbon black, coal dust, titanium dioxide, talc and barium sulfate. Lead pigments may also be used. The pigment content of the aqueous dispersion, generally expressed as the pigment to resin (or binder) ratio (P/B) is usually about 0.1:1 to 1:1.

Examples of catalyst are tin and lead. Preferably however, the electrodepositable compositions are free of lead and/or tin.

In the process of electrodeposition the aqueous dispersion is placed in contact with an electrically conductive anode and cathode. Upon passage of an electric current between the anode and cathode while they are in contact with the aqueous dispersion, an adherent film of the electrodepositable composition will deposit in a substantially continuous manner on the cathode. Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter) and tends to decrease quickly during the electrodeposition process, indicating formation of a continuous self-insulating film. Any electroconductive substrate, especially metal substrates such as steel, zinc, aluminum, copper, magnesium or the like can be coated with the electrodepositable composition of the present invention. Steel substrates are preferred because the composition provides significant corrosion protection to these substrates. Although it is conventional to pretreat the steel substrate with a phosphate conversion coating followed by a chromic acid rinse, the composition of the present invention may be applied to steel substrates which have not been given a chrome rinse and still provides excellent corrosion resistance.

After deposition, the coating is heated to cure the deposited composition. The heating or curing operation is usually carried out at a temperature in the range of from about 150 to about 205° C., preferably from about 150 to about 177° C. for a period of time ranging from 10 to 60 minutes. Note that when the capped polyisocyanate curing agent is capped with 2-(2-hydroxyethoxy)phenol, the electrodepositable composition of the present invention is curable at a temperature range of about 150 to about 177° C. The thickness of the resultant film is usually from about 10 to 50 microns.

The composition can be applied by means other than electrodeposition including brushing, dipping, flow coating, spraying and the like, but it is most often applied by electrodeposition.

The invention will be further described by reference to the following examples. Unless otherwise indicated, all parts are by weight.

Example I

This example compares dibutyltin oxide with three different types of bismuth catalysts for their efficiency in curing an electrodepositable composition comprising a cationic resin and a capped polyisocyanate resin.

Example IA

A paste containing only hiding and extender pigments was prepared from the following ingredients:

| Material | Parts by weight |
| --- | --- |
| pigment grinding vehicle[1] | 535.7 |
| titanium dioxide[2] | 919.5 |
| carbon black[3] | 45.0 |
| aluminum silicate[4] | 535.5 |
| deionized water | 964.3 |

[1]The pigment grinding vehicle was prepared by first preparing a quaternizing agent followed by reacting the quaternizing agent with an epoxy resin. The quaternizing agent was prepared as follows:

| Material | Solution weight (grams) |
| --- | --- |
| 2-ethylhexanol half-capped toluene diisocyanate, 95% in MIBK | 320 |
| dimethylethanolamine (DMEA) | 87.2 |
| aqueous lactic acid solution, 88% | 117.6 |
| 2-butoxyethanol | 39.2 |

The 2-ethylhexanol half-capped toluene diisocyanate was added to the DMEA in a suitable reaction vessel at room temperature. The mixture exothermed and was stirred for one hour at 80° C. The aqueous lactic acid solution was then charged followed by addition of 2-butoxyethanol. The reaction mixture was stirred for about one hour at 65° C. to form the quaternizing agent.

The pigment grinding vehicle was prepared as follows:

| Material | Solution weight (grams) |
| --- | --- |
| EPON 829[a] | 710 |
| Bisphenol A | 289.6 |
| 2-ethylhexanol half-capped toluene diisocyanate, 95% in MIBK | 406 |
| quaternizing agent described above | 496.3 |
| deionized water | 71.2 |
| 2-butoxyethanol | 1205.6 |

[a]Diglycidyl ether of Bisphenol A available from Shell Oil and Chemical Co.

The EPON 829 and Bisphenol A were charged under a nitrogen atmosphere to a suitable reactor and heated to 150 to 160° C. to initiate an exotherm. The reaction mixture was permitted to exotherm for one hour at 150 to 160° C. The reaction mixture was then cooled to 120° C. and the 2-ethylhexanol half-capped toluene diisocyanate added. The temperature of the reaction mixture was held at 110 to 120° C. for one hour followed by the addition of the 2-butoxyethanol. The reaction mixture was then cooled to 85 to 90° C., homogenized, and charged with water followed by the quaternizing agent. The temperature of the reaction mixture was held at 80 to 85° C. until an acid value of about 1 was obtained. The final product had a solids content of about 56.0%. [2]Available from E. I. du Pont de Nemours and Company as R-900. [3]Available from the Columbian division of Cities Service Co. as Raven 410. [4]Available from Engelhard Corp. as ASP-200.

The paste of Example IA was sand milled to a Hegman reading of 7.

Example IB

A dibutyltin oxide paste was prepared from the following ingredients:

| Material | Parts by weight |
| --- | --- |
| Pigment grinding vehicle of Example IA | 212.4 |
| dibutyltin oxide | 300.0 |
| deionized water | 400.0 |

The paste of Example IB was sand milled to a Hegman reading of 7.

Example IC

A bismuth dimethyldithiocarbamate paste was prepared from the following ingredients:

| Material | Parts by weight |
| --- | --- |
| Pigment grinding vehicle of Example IA | 373.2 |
| bismuth dimethyldithiocarbamate[5] | 209.0 |
| deionized water | 795.1 |

[5]Available from R. T. Vanderbilt Co. as BISMATE.

The paste of Example IC was sand milled to a Hegman reading of 7.

Example ID

Bismuth lactate was prepared from the following ingredients:

| Material | Parts by weight |
|---|---|
| bismuth trioxide | 200.0 |
| 88% lactic acid in water | 307.5 |
| deionized water | 568.2 |

The lactic acid and deionized water were charged to a reaction flask and heated to 70° C. 50 grams of bismuth trioxide were added and the mixture held at 70° C. for one hour, followed by addition of 50 grams more bismuth trioxide and holding of the mixture at 70° C. for one hour. Then 50 more grams of bismuth trioxide was added and the mixture held at 70° C. for another hour. The final 50 grams of bismuth trioxide was added and the mixture held at 70° C. for six hours. The reaction mixture was filtered and dried to 100% bismuth lactate.

Example IE

A bismuth lactate paste was prepared from the following ingredients:

| Material | Parts by weight |
|---|---|
| Pigment grinding vehicle of Example IA | 482.1 |
| bismuth lactate of Example ID | 270.0 |
| deionized water | 797.9 |

The paste of Example IE was sand milled to a Hegman reading of 7.

Example IF

A solution of bismuth aminocaproate and sulfamate was prepared from the following ingredients:

| Material | Parts by weight |
|---|---|
| 6-aminocaproic acid | 225.11 |
| sulfamic acid | 62.57 |
| deionized water | 595.01 |

The above solution was heated in a reaction vessel to 70° C. 50 grams of bismuth trioxide were added and the mixture held at 70° C. for 79 minutes, followed by addition of 50 grams more bismuth trioxide and holding of the mixture at 70° C. for 42 minutes. Then 50 more grams of bismuth trioxide was added and the mixture held at 70° C. for 70 minutes. A final 50 grams of bismuth trioxide was added and the mixture held at 70° C. for 411 minutes. The mixture was allowed to settle and the supernatant filtered to a clear solution with a solids content of 44.4%.

Example IG

A catalysts-free cationic electrodeposition bath was prepared from the following ingredients:

| Material | Parts by weight |
|---|---|
| E6214[6] | 4476.3 |
| pigment paste of Example IA | 515.8 |
| deionized water | 5007.9 |

[6]A blend of cationic resins and additives at 40% solution in water, available from PPG Industries, Inc.

Examples IH through IS

The bath of Example IG was separated into four 2500 part portions (Examples IH–IJ, IK–IM, IN–IP, and IQ–IS), to which were added increasing increments of the catalysts of Examples IB, IC, IE and IF at equal metal concentrations. After the addition of each increment of catalyst, a test panel was electrocoated as described below for each example. (See Table I.) Smooth, zinc phosphated steel panels were electrocoated at 245 volts at 82° F. (27.8° C.) to yield a coating of 0.9 to 1.0 mils (22.9 to 25.4 microns). The panels were cured at various temperatures and evaluated for acetone resistance as shown in Table I.

TABLE I

| | | | | Acetone resistance[8] Cured for 30 minutes at temperature specified | | | | | |
|---|---|---|---|---|---|---|---|---|---|
| Example | parts IG | parts catalyst | % metal[7] | 310° F. 154.4° C. | 325° F. 162.8° C. | 340° F. 191.1° C. | 360° F. 182.2° C. | 380° F. 193.3° C. | 400° F. 204.4° C. |
| IH | 2500 | — | — | 0 | 0 | 0 | 0 | 1 | 2 |
| II | 2500 | 14.8 (IB) | 0.5% Sn | 7 | 10 | 10 | 10 | 10 | 10 |
| IJ | 2500 | 29.6 (IB) | 1.0% Sn | 9 | 10 | 9 | 10 | 10 | 8 |
| IK | 2500 | 13.8 (IF) | 0.5% Bi | 0 | 1 | 4 | 8 | 8 | 8 |
| IL | 2500 | 27.6 (IF) | 1.0% Bi | 4 | 7 | 9 | 8 | 9 | 9 |
| IM | 2500 | 41.4 (IF) | 1.5% Bi | 7.5 | 10 | 9 | 8 | 9 | 8 |
| IN | 2500 | 42.0 (IC) | 0.5% Bi | 0 | 4 | 6.5 | 9 | 10 | 10 |
| IO | 2500 | 84.0 (IC) | 1.0% Bi | 0 | 6 | 7 | 9 | 10 | 10 |
| IP | 2500 | 126.0 (IC) | 1.5% Bi | 0 | 6 | 9 | 9 | 10 | 9 |
| IQ | 2500 | 27.8 (IE) | 0.5% Bi | 7 | 9 | 10 | 8 | 8 | 7 |
| IR | 2500 | 55.6 (IE) | 1.0% Bi | 8 | 9 | 9 | 8 | 7 | 7 |
| IS | 2500 | 83.4 (IE) | 1.5% Bi | 7 | 10 | 8 | 9 | 7 | 7 |

[7]On total resin solids

TABLE I-continued

| | | | | Acetone resistance[8] Cured for 30 minutes at temperature specified | | | | | |
|---|---|---|---|---|---|---|---|---|---|
| Example | parts IG | parts catalyst | % metal[7] | 310° F. 154.4° C. | 325° F. 162.8° C. | 340° F. 191.1° C. | 360° F. 182.2° C. | 380° F. 193.3° C. | 400° F. 204.4° C. |

[8]An acetone saturated cloth was firmly rubbed back and forth across the cured coating surface until the substrate was exposed or until 100 double rubs were made. Panels were rated on a scale of 0 to 10 based on the number of double rubs made or by the condition of the 100 double rub surface, using the following scale: 10, no effect; 9, slight mark; 8, mark; 7, dull; 6, soft; 5, 80–100; 4, 60–80; 3, 40–60; 2, 20–40; 1, 10–20; 0, <10.

All the catalysts were effective, with the bismuth dimethyldithiocarbamate requiring higher cure temperature for complete acetone resistance. However, the bismuth dimethyldithiocarbamate was the best of the bismuth catalysts for appearance, as shown in Table II.

TABLE II

| Example | Catalyst | Cure (30 minutes) | Acetone resistance | $R_A$[9] |
|---|---|---|---|---|
| II | 0.5% Sn as DBTO | 171.1° C. | 10 | 7 |
| IK | 0.5% Bi as bismuth aminocaproate/sulfamate | 182.2° C. | 8 | 13 |
| IN | 0.5% Bi as bismuth dimethyldithiocarbamate | 193.3° C. | 10 | 7 |
| IQ | 0.5% Bi as bismuth lactate | 171.1° C. | 10 | 8 |

[9]Relative roughness of the coating surface is measured with a Surfanalyzer, Model 21-9010-01, Federal Products, Inc. The number reported is the average roughness, or the average vertical distance of any point on the surface from a centerline determined by a stylus moving across the surface, expressed in micro-inches. Lower numbers indicate greater smoothness.

Example II

This example compares bismuth dimethyldithiocarbamate with zinc dimethyldithiocarbamate in a reduced cure electrodepositable composition comprising a cationic resin and a polyisocyanate resin capped with 2-(2-hydroxyethoxy)phenol.

A cationically electrodepositable main vehicle was prepared from the following ingredients.

| Ingredients | Parts by Weight |
|---|---|
| EPON 828[10] | 1106.42 |
| Bisphenol A-ethylene oxide adduct (⅙ molar ratio) | 225 |
| Bisphenol A | 477.76 |
| Methyl isobutyl ketone | 36.92 |
| Ethyltriphenyl phosphonium iodide | 1.08 |
| Bisphenol A-ethylene oxide adduct (⅙ molar ratio) | 225 |
| Methyl isobutyl ketone | 0.41 |
| Diketimine[11] | 114.68 |
| N-methyl ethanol amine | 97.93 |
| Crosslinker[12] | 1923.79 |

[10]Polyglycidyl ether of Bisphenol A, available from Shell Oil and Chemical Co.
[11]Diketimine derived from diethylenetriamine and methyl isobutyl ketone (73% solids in methyl isobutyl ketone).
[12]The capped polyisocyanate crosslinker was prepared from the following mixture of ingredients:

| Ingredients | Parts by Weight |
|---|---|
| 2-(2-Hydroxyethoxy phenol)[a] | 2158.38 |
| Methyl isobutyl ketone | 1278.06 |
| Dibutyltin dilaurate | 1.4 |
| Polymeric MDI[b] | 1848 |
| Methyl isobutyl ketone | 56 |

[a]Commercially available from Aldrich Chemical Company, Inc.
[b]Polymeric MDI available from DOW CHEMICAL as PAPI 2940.

The 2-(2-Hydroxyethoxy phenol), methyl isobutyl ketone and dibutyltin dilaurate were charged to a reaction flask under a nitrogen atmosphere and heated to 70° C. To this solution was added PAPI 2940 slowly keeping the reaction temperature below 80° C. Upon completion of the addition, a second charge of methyl isobutyl ketone was added and the mixture held at 85° C. until infrared analysis indicated no unreacted NCO remained.

The EPON 828, initial charge of Bisphenol A-ethylene oxide adduct, Bisphenol A and the initial charge of methyl isobutyl ketone were charged to a reaction vessel and heated under a nitrogen atmosphere to 125° C. Ethyl triphenyl phosphonium iodide then was added and the reaction mixture allowed to exotherm to about 145° C. The reaction was held at 145° C. for 2 hours and the second charge of Bisphenol A-ethylene oxide adduct was added and the epoxy equivalent weight was measured. The epoxy equivalent was close to the target epoxy equivalent weight; the reaction was cooled to 95° C. and the second charge of methyl isobutyl ketone, the diketimine and N-methylethanolamine were added in succession. The mixture was allowed to exotherm and then a temperature of 125° C. was established. The mixture was held at 125° C. for 1 hour. The crosslinker then was added and the reaction mixture was stirred for 15 minutes at 105° C. The resin mixture (3800 parts) was dispersed in aqueous medium by adding it to a mixture of 81.78 parts of sulfamic acid and 2188 parts of deionized water. After 60 minutes, the dispersion was further thinned with 1348.84 parts of deionized water and 1366.59 parts of deionized water in stages and vacuum stripped to remove organic solvent to yield a dispersion having a solids content of 41.12 percent and a particle size of 910 Angstroms.

Example IIB

A paste containing only hiding and extender pigments was prepared from the following ingredients:

| Material | Parts by weight |
|---|---|
| pigment grinding vehicle of Example IA | 488.0 |
| deionized water | 840.6 |
| titanium dioxide | 1023.6 |
| aluminum silicate | 597.0 |
| carbon black | 50.8 |

The paste of Example IIB was sand milled to a Hegman reading of 7.

Example IIC

A bismuth dimethyldithiocarbamate paste was prepared from the following ingredients:

| Material | Parts by weight |
|---|---|
| Pigment grinding vehicle of Example IA | 184.8 |
| bismuth dimethyldithiocarbamate | 105.0 |
| deionized water | 210.0 |

The paste of Example IIC was sand milled to a Hegman reading of 7.

Example IID

A zinc dimethyldithiocarbamate paste was prepared from the following ingredients:

| Material | Parts by weight |
|---|---|
| Pigment grinding vehicle of Example IA | 183.8 |
| zinc dimethyldithiocarbamate[13] | 105.0 |
| deionized water | 270.0 |

[13] Available from R. T. Vanderbilt Co. as METHYL ZIMATE.

The paste of Example IID was sand milled to a Hegman reading of 7.

Example IIE

A cationic electrodeposition bath was prepared from the following ingredients:

| Ingredients | Parts by Weight |
|---|---|
| Main resin of Example IIA | 1399.2 |
| Co-resin 1[14] | 166.8 |
| Butyl CARBITOL formal plasticizer[15] | 27.1 |
| Ethylene glycol monohexyl ether | 20.3 |
| Co-resin 2[16] | 73.9 |
| Deionized water | 1880.0 |
| hiding and extender pigment paste | 186.9 |
| bismuth dimethyldithiocarbamate paste | 45.8 |
| TOTAL | 3800.0 |

[14] An aqueous dispersion of a flexibilizer-flow control agent generally in accordance with U.S. Pat. No. 4,423,166 was prepared for use with the electrodepositable composition. The flexibilizer-flow control agent was prepared from a polyepoxide (EPON 828) and a polyoxyalkylene-polyamine (JEFFAMINE D-2000 from Texaco Chemical Co.). The flexibilizer-flow control agent was dispersed in aqueous medium with the aid of lactic acid and the dispersion had a resin solids content of 36.2%.
[15] The reaction product of 2 moles of diethylene glycol butyl ether and 1 mole of formaldehyde, prepared as generally described in U.S. Pat. No. 4,891,111.
[16] A cationic microgel prepared as generally described in Examples A and B of U.S. Pat. No. 5,096,556, with the exception that acetic acid instead of lactic acid was used to disperse the soap of Example A, ethylene glycol butyl ether instead of MIBK was used as a solvent in the soap of Example A, and EPON 828 solution was added after stripping rather than before in Example B. The resin had a final solids content of 18.3%.

The co-resin 1, butyl CARBITOL formal, and ethylene glycol monohexyl ether were preblended before adding to the main resin. The amount of bismuth metal on total resin solids was 0.506%.

Example IIF

A cationic electrodeposition bath was prepared as in Example IIE, except that instead of adding bismuth dimethyldithiocarbamate paste, zinc dimethyldithiocarbamate paste was added in an amount of 87.9 parts, contributing 0.506% zinc on total resin solids. The amount of deionized water was adjusted to yield 3800.0 parts total bath.

Smooth, zinc phosphated steel panels were coated in the baths of IIE and IIF at 275 volts for two minutes at temperatures from 95° F. (35.0° C.) to 101° F. (38.3° C.) to obtain cured film builds of 0.9 mil (22.86 microns). Various panels were cured for 30 minutes at temperatures ranging from 285° F. (140.6° C.) to 340° F. (171.1° C.) to evaluate appearance, "wet substrate" appearance, and solvent resistance. In addition, untreated aluminum foil was coated to evaluate Thermogravimetric Analysis (TGA) cure characteristics. Results are in Table III.

TABLE III

| Example | IIE | IIF |
|---|---|---|
| metal at 0.506% on total resin solids | Bi | Zn |
| $R_A$, 171.1° C. cure | 8 | 10 |
| wet substrate rupture rating[17], 171.1° C. cure | 7 | 5 |
| appearance after stirred bath aging | satisfactory, 1 month | rupture patterns, 1 day |
| bath odor | none | distinct |
| acetone resistance, 171.1° C. cure | 10 | 10 |
| acetone resistance, 162.7° C. cure | 10 | 10 |
| acetone resistance, 154.5° C. cure | 10 | 10 |
| acetone resistance, 140.6° C. cure | 1 | 6 |
| TGA cure rate[18], 162.7° C. cure | 175 | 232 |

[17] A smooth, zinc phosphated steel panel is prewet with deionized water, then quickly electrocoated under normal coating conditions. After baking, observations are made of a tendency to produce swirling, ruptured and raised defect areas. The rupturing patterns are rated on a scale of 0 to 10, 10 being the best.
[18] Thermo-Gravimetric Analysis: The weight loss of a curing coating is monitored versus time for thirty (30) minutes at 325° F. (162.7° C.). The linear portion of the plot of the rate of change of the rate of weight loss versus time is recorded, expressed as percent weight loss per minute$^2$ times $10^3$ (% weight loss/min$^2$ × $10^3$). The higher the values, the faster the weight loss and the greater the cure rate.

Table III illustrates that zinc dimethyldithiocarbamate is a slightly better catalyst for cure than bismuth dimethyldithiocarbamate, but suffers from the detriments of odor, reduced appearance, increased sensitivity to wet substrate rupturing, and poor bath stability.

We claim:

1. An electrodepositable composition comprising (a) an active hydrogen-containing, cationic salt group-containing resin electrodepositable on a cathode; (b) a capped polyisocyanate curing agent; and (c) bismuth diorganodithiocarbamate.

2. The electrodepositable composition of claim 1 in which the active hydrogen-containing, cationic salt group-containing resin is derived from a polyepoxide.

3. The electrodepositable composition of claim 1 which is free of lead.

4. The electrodepositable composition of claim 3 which is free of tin.

5. The electrodepositable composition of claim 1 in which the cationic salt groups are amine salt groups.

6. The electrodepositable composition of claim 1 in which component (c) is selected from the group consisting of bismuth dimethyldithiocarbamate, bismuth diisopropyldithiocarbamate and the dithiocarbamate of N-methylpiperazine.

7. The electrodepositable composition of claim 1 in which the active hydrogen-containing, cationic salt group-containing resin is present in amounts of about 50 to about 70 percent by weight, based on the total weight of main vehicle resin solids.

8. The electrodepositable composition of claim 1 in which the capped polyisocyanate curing agent is present in amounts of about 30 to about 50 percent by weight, based on the total weight of main vehicle resin solids.

9. The electrodepositable composition of claim 1 in which (c) is present in the electrodepositable composition in amounts of about 0.2 to about 1.5 percent by weight bismuth based on the total weight of solids in the electrodepositable composition.

10. The electrodepositable composition of claim 1 in which the capped polyisocyanate curing agent is at least partially capped with a material of the structure:

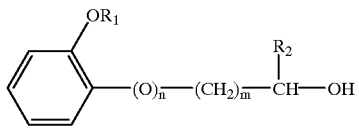

wherein n is 0 or 1; m is 0, 1, or 2, $R_1$ is H or an alkyl group having from 1 to 10 carbon atoms or an aryl group having from about 6 to about 10 carbon atoms and $R_2$ is H or an alkyl group having from 1 to 30 carbon atoms or an aryl group having from 6 to 30 carbon atoms.

11. The electrodepositable composition of claim 10 in which the capped polyisocyanate curing agent is at least partially capped with 2-(2-hydroxyethoxy)phenol.

12. The electrodepositable composition of claim 11 which is curable at a temperature range of about 150 to about 177° C.

13. A method of electrocoating an electroconductive substrate which serves as a cathode in an electrical circuit comprising said cathode and an anode immersed in an aqueous electrodepositable composition containing a cationic water dispersible resin, said method comprising passing an electric current between the anode and the cathode to cause the electrodepositable composition to deposit on the cathode as a substantially continuous film, and heating the electrodeposited film at an elevated temperature to cure the film, wherein the electrodepositable composition comprises (a) an active hydrogen-containing, cationic salt group-containing resin electrodepositable on a cathode; (b) a capped polyisocyanate curing agent; and (c) bismuth diorganodithiocarbamate.

14. The method of claim 13 in which the active hydrogen-containing, cationic salt group-containing resin is derived from a polyepoxide.

15. The method of claim 14 in which the cationic salt groups are amine salt groups.

16. The method of claim 13 in which the electrodepositable composition is free of lead.

17. The method of claim 16 in which the electrodepositable composition is free of tin.

18. The method of claim 13 in which (c) is selected from the group consisting of bismuth dimethyldithiocarbamate, bismuth diisopropyldithiocarbamate and the dithiocarbamate of N-methylpiperazine.

19. The method of claim 13 in which the active hydrogen-containing, cationic salt group-containing resin is present in the electrodepositable composition in amounts of about 50 to about 70 percent by weight, based on the total weight of main vehicle resin solids.

20. The method of claim 13 in which the capped polyisocyanate curing agent is present in the electrodepositable composition in amounts of about 30 to about 50 percent by weight, based on the total weight of main vehicle resin solids.

21. The method of claim 13 in which component (c) is present in the electrodepositable composition in amounts of about 0.2 to about 1.5 percent by weight bismuth based on the total weight of solids in the electrodepositable composition.

22. The method of claim 13 in which the electrodeposited film is heated at an elevated temperature of about 300 to about 400° F. (about 150 to about 205° C.) to cure the film.

23. The method of claim 13 in which the capped polyisocyanate curing agent is at least partially capped with a material of the structure:

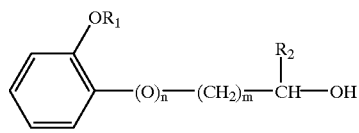

wherein n is 0 or 1; m is 0, 1, or 2, $R_1$ is H or an alkyl group having from 1 to 10 carbon atoms or an aryl group having from about 6 to about 10 carbon atoms and $R_2$ is H or an alkyl group having from 1 to 30 carbon atoms or an aryl group having from 6 to 30 carbon atoms.

24. The method of claim 23 in which the capped polyisocyanate curing agent is at least partially capped with 2-(2-hydroxyethoxy)phenol.

25. The method of claim 24 in which the electrodeposited film is heated at an elevated temperature of about 150 to about 177° C. to cure the film.

* * * * *